INVENTOR.
A. J. AVILA
S. J. BUZASH
R. E. THOMAS
BY H. J. Winegar
ATTORNEY

INVENTOR.
A. J. AVILA
S. J. BUZASH
R. E. THOMAS
BY H.J.Winegar
ATTORNEY

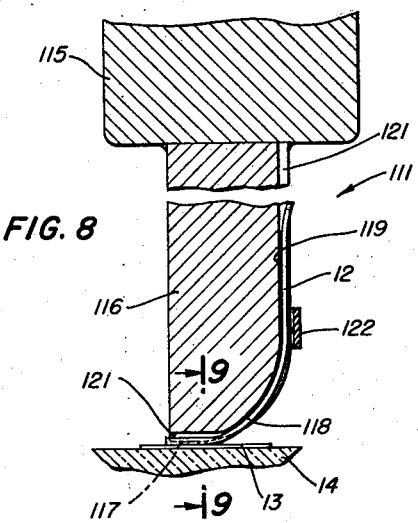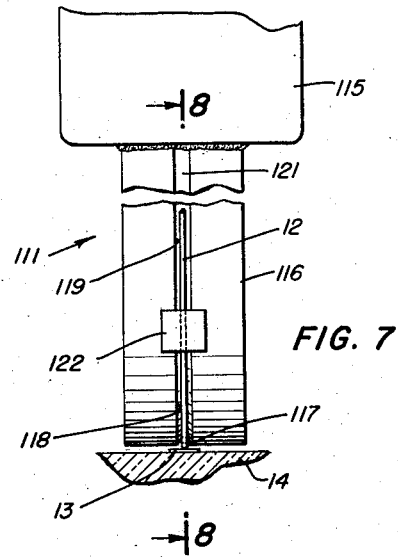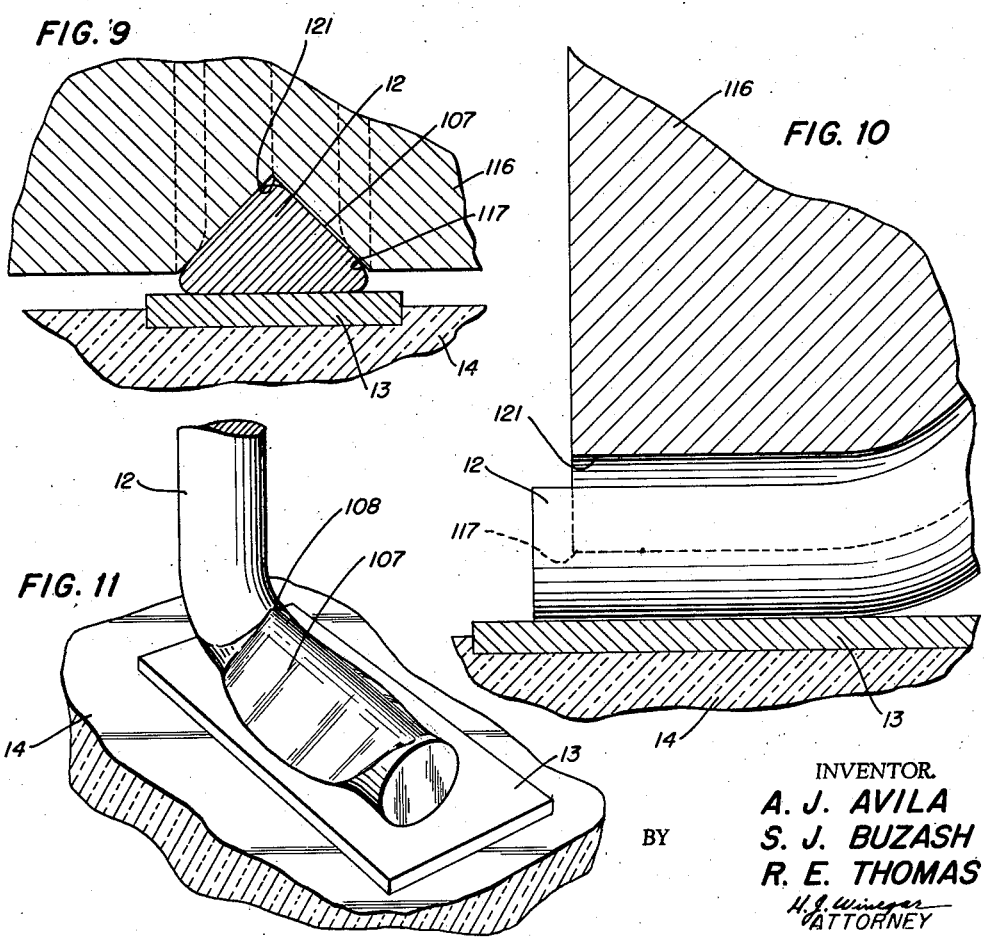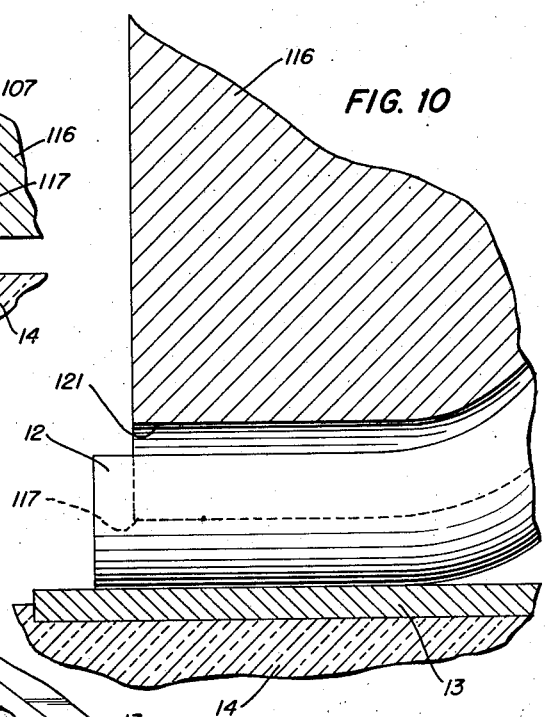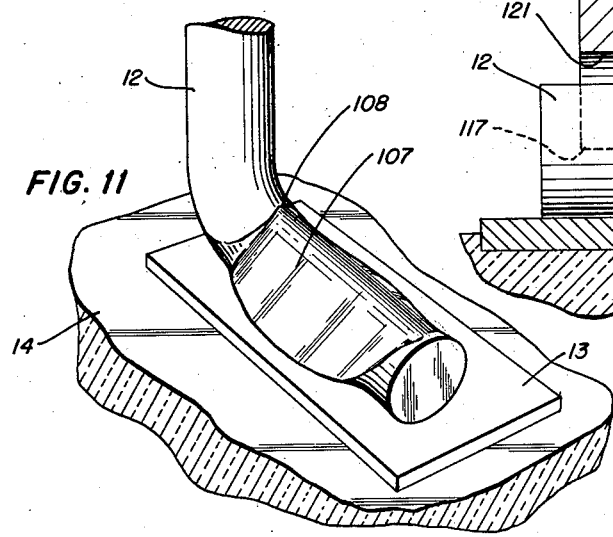

United States Patent Office 3,128,649
Patented Apr. 14, 1964

3,128,649
BONDING DEVICE FOR JOINING A WIRE-LIKE MEMBER TO A PART
Arthur J. Avila, Flemington, and Steven J. Buzash, Riverside, N.J., and Ralph E. Thomas, Yardley, Pa., assignors to Western Electric Company, Incorporated, a corporation of New York
Filed Aug. 30, 1961, Ser. No. 135,051
6 Claims. (Cl. 78—82)

This invention relates to a device for joining a wire-like member to a preselected part, and more particularly to a groove-type needle bonding device for ultrasonically joining a gold wire to a contact area of a semiconductive body.

In the manufacture of electrical components, particularly transistors, it is frequently necessary to join a conductive lead often times finer than a human hair to a minute preselected part, such as a contact area of stripe on a semiconductive body. In order not to alter the electrical characteristics of the semiconductive body, such joining must be accomplished with a minimum of heat and pressure. Consequently, such joining is often accomplished with ultrasonic bonding energy. To efficiently utilize the ultrasonic bonding energy, it is extremely important to provide an efficient coupling device for firmly gripping the lead, which is to be joined to the transistor stripe, and concentrating the ultrasonic energy at the lead-stripe interface where the bond is desired. By so gripping the lead and concentrating the ultrasonic energy at the lead-stripe interface, elimination of an excessive lead mash-out and energy loss can be accomplished.

Accordingly, it is a primary object of the present invention to provide a relatively simple and efficient device for joining a wire-like member to a preselected part.

Another object of the invention resides in the provision of a groove-type needle bonding device for joining a gold wire to a transistor stripe.

Apparatus illustrating certain features of this invention may include an elongated member having a groove formed at one end thereof for supporting a wire-like member in bonding position.

More particularly, apparatus illustrating certain features of the invention may include a groove-type needle bonding device having an elongated member with a flat surface at one end thereof. A pair of parallel contiguous tungsten wires having diameters of substantially twice that of a gold wire to be bonded are fixed to the flat surface to form a groove for supporting the gold wire in bonding position.

A complete understanding of the invention may be had from the following detailed description of a specific embodiment thereof when read in conjunction with the appended drawings, wherein:

FIG. 5 also illustrates a sectional view of a chuck for gripping the needle bonding devices of FIGS. 1, 2 and 7–10;

FIG. 7 is an enlarged front elevational view of a V-shaped groove-type needle bonding device;

FIG. 8 is a sectional view taken along line 8—8 of FIG. 7;

FIG. 9 is a greatly enlarged fragmentary sectional view taken along line 9—9 of FIG. 8;

FIG. 10 is a greatly enlarged fragmentary sectional view of an end portion of the V-shaped groove-type needle bonding device of FIG. 8; and FIG. 11 shows a greatly enlarged perspective view of a bond made with the V-shaped groove-type needle bonding device of FIGS. 7–10.

Figure 1:
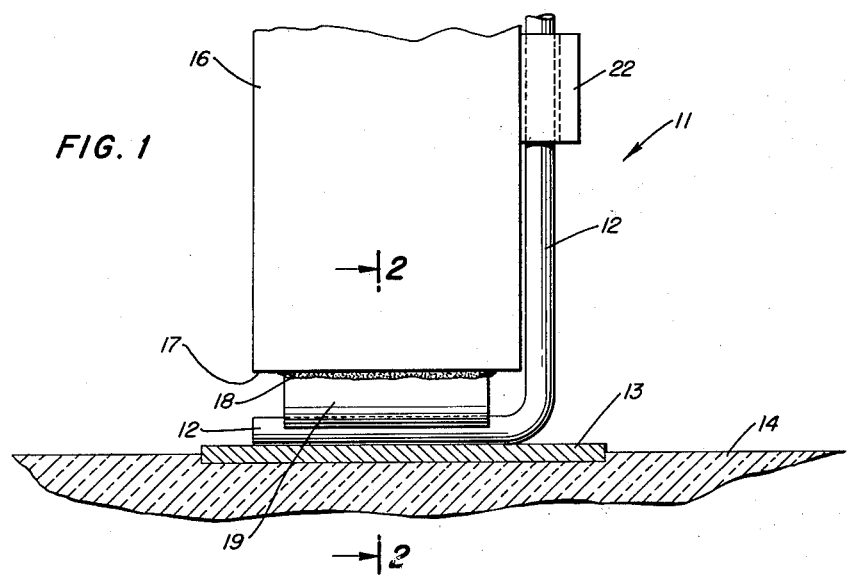
FIG. 1 is an enlarged side elevational view, partly in section, of a groove-type needle bonding device.

Referring new to FIG. 1, there is shown a groove-type needle bonding device, designated generally by the numeral 11, for bonding a lead 12 to a preselected part, such as a contact area of stripe 13 formed on a semiconductive body 14. Such stripe 13 is typically formed by sputtering aluminum on a predetermined portion of the semiconductive body 14. To produce high frequency transistors, the stripes 13 of the semiconductive body 14 must have extremely small surface areas, such as two by four mils; therefore, the lead 12 must have an extremely small diameter, such as one mil (about one quarter the size of a human hair). Moreover, due to the highly desirable electrical characteristics of gold and the ease with which it is bonded, the lead 12 is advantageously composed of gold.

The groove-type needle bonding device 11 includes an elongated member 16, formed of steel or a comparable substance, having a flat surface 17 on one end thereof. Fixed by welds 18, or the like, to the flat surface 17 is a bonding tip formed of a pair of parallel contiguous cylindrical members 19 composed of a material which is hard and impenetrable as compared to the lead 12. Advantageously, this material is tungsten. These cylindrical members 19, FIG. 2, form a groove 21 for passing a lead 12 from a guide 22 into bonding position. Preferably, both cylindrical members 19 are substantially equal to twice the diameter of the lead 12 in order to firmly grip the lead 12 and concentrate the ultrasonic energy at the lead-stripe interface where the bond is desired. By so gripping the lead 12 with the groove 21 formed between the cylindrical members 19 and concentrating the ultrasonic energy, excessive lead mash-out, back-welding and energy loss are virtually eliminated, thereby obtaining optimum bond mash-out and strength.

Figure 2:
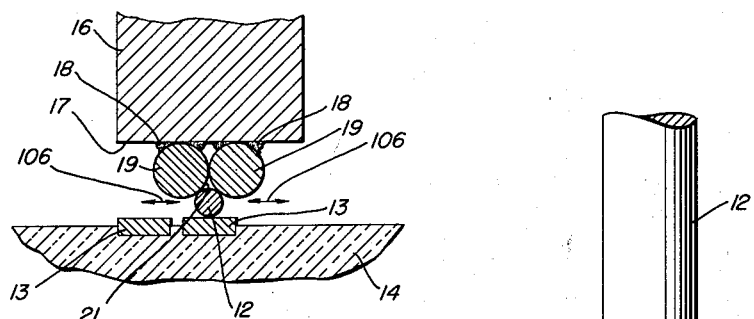
FIG. 2 shows a fragmentary sectional view taken along line 2—2 of FIG. 1.
Figure 4:
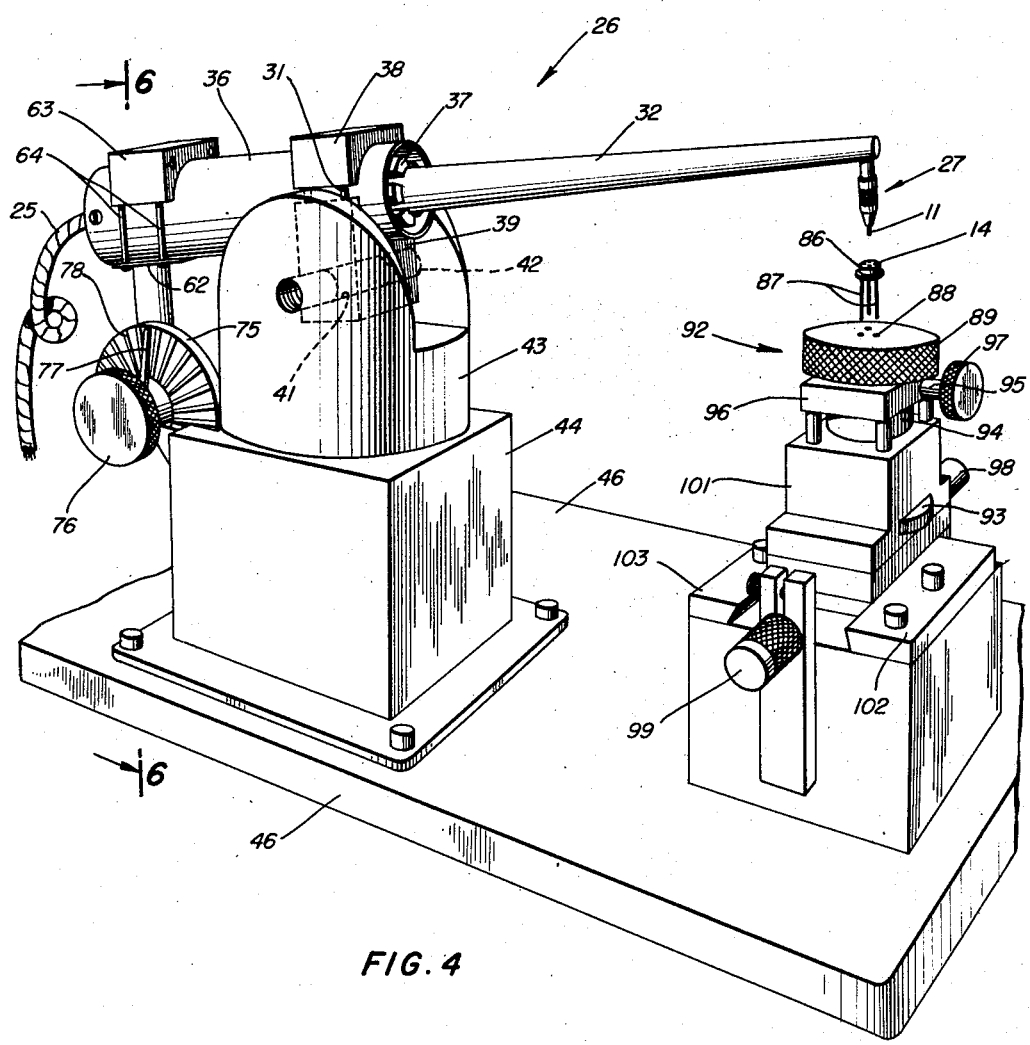
FIG. 4 is a perspective view illustrating an ultrasonic bonding apparatus which uses the needle bonding devices of FIGS. 1, 2 and 7–10 to effect to effect a bond.

Referring now to FIG. 4 there is shown a perspective view of an ultrasonic bonding apparatus, designated generally by the numeral 26, for transmitting ultrasonic bonding energy to the needle bonding device 11 of FIGS. 1 and 2 to effect a bond.

Figure 5:
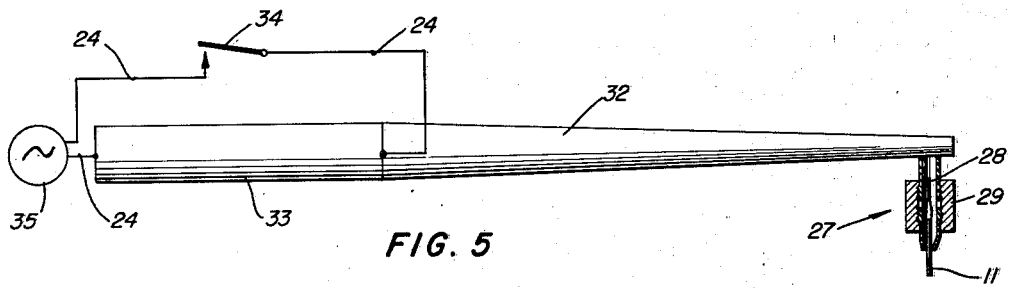
FIG. 5 is a side elevational view illustrating an ultrasonic transducer used to produce ultrasonic vibrations in the apparatus of FIG. 4.

More particularly, the groove-type needle bonding device 11 is mounted in a conventional chuck 27, FIGS. 4 and 5, by forcing the device 11 between the ends of an externally threaded bifurcated member 28 and rotating in a clockwise direction a coacting internally threaded sleeve 29. Such rotation of sleeve 29 forces the ends of the bifurcated member 28 toward each other to firmly grip the needle bonding device 11. The member 28 is fixed to an elongated arm 32 by welding or a similar fixing expedient. Fixed to the arm 32 by soldering, or the like, is a transducer 33 which is connected by a pair of conductors 24, FIG. 5, located in a cable 25, FIG. 4, through a switch 34 to an alternating current source 35. Upon closure of the switch 34, the transducer 33 serves to convert electrical energy from the source 35 into ultrasonic bonding energy. For ultrasonic bonding of fine gold leads to transistor strips, source 35 has a frequency in the range of about 20,000 c.p.s. to about 60,000 c.p.s.

The transducer 33 may be of the ceramic type such as barium titanate, lead zirconate, or the like. Alternatively, the transducer may equally well be of the magnetostrictive type.

Figure 6:
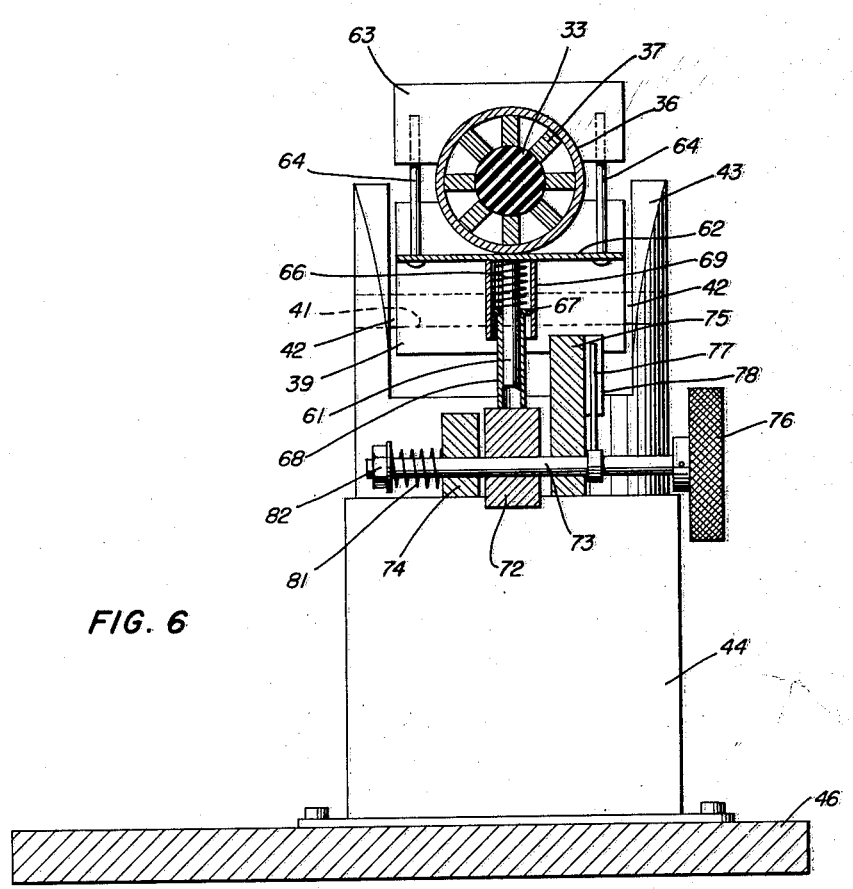
FIG. 6 is a side view partly in section taken substantially along line 6—6 of FIG. 4 and illustrates a spring-biased sleeve arrangement for applying a bonding pressure between a lead and a preselected part.

The transducer 33 is mounted securely within a tubular member 36, FIGS. 4 and 6, by a plurality of elongated wedges 37. Holding the tubular member 36 are a first clamp 38 and a cooperating second clamp 39. These clamps 38 and 39 are held together by threaded members 31. Positioned within an aperture 41 provided in the second clamp 39 is a pan 42, the ends of which are fixed to a cradle 43. A stand 44 fixes the cradle 43 to a support 46. The pin 42 positioned in the aperture 41 of the clamp 39 permits pivotal movement of the needle bonding device 11 relative to the support 46.

To control the pressure between the cylindrical members 19 and the stripe 13, a spring-biased sleeve arrangement, shown in detail in FIG. 6, is fixed to an end of the tubular member 36. This arrangement includes a shaft 61 fixed to a plate 62 which is fastened to a clamp 63 by a pair of threaded members 64. A compression spring 66 is positioned circumferentially about the shaft 61 between the plate 62 and a washer 67 to force them apart. Located about the shaft 61 there is a sleeve 68 which contacts the washer 67. Another sleeve 69 is placed about the spring 66, washer 67 and sleeve 68 to prevent any dust or dirt in the surrounding atmosphere from fouling up the spring 66.

In contact with the sleeve 68, there is a cam 72 for sliding the sleeve 68 on the shaft 61 to control the force of the spring 66 on the plate 62. The cam 72 is fixed to a shaft 73 which is rotatably held by a mounting 74 and a retainer 75. Both the mounting 74 and retainer 75 are fixed to the stand 44.

Secured to one end of the shaft 73 is a knurled knob 76 for axially moving the shaft 73 rightwardly, as viewed in FIG. 6, against the action of a compression spring 81. The compression spring 81 is positioned circumferentially about the shaft 73 between the mounting 74 and a member 82 which is threaded to the other end of the shaft 73. Such rightward axial movement of the shaft 73 moves a pin 77 fixed to the shaft 73 out of any one of a plurality of radial slots 78. Additionally, such axial movement of the shaft 73 by the knob 76 permits the pin 77 to be rotated to any of the other radial slots 78 to thereby control the force with which the spring 66 pushes upwardly on the plate 62. After the pin 77 is located over a particular radial slot 78 so that the spring 66 pushes up against the plate 62 with a desired force, the knob 76 is released so that the spring 81 forces the pin 77 into the particular slot 78. Thus, by controlling the upward force of the spring 66 against the plate 62, the pressure between the cylindrical members 19 and the stripe 13 formed on the semiconductive body 14 can be controlled.

In the fabrication of transistors, the semiconductive body 14, upon which the stripe 13 is formed, is usually fixed by soldering, brazing, or the like, to a header 86 (illustrated in FIG. 4) which must be securely held during bonding. Conveniently, the header 86 may be so held by inserting leads 87 thereof into a plurality of apertures 88 corresponding to such leads 87. These apertures 88 are formed in a disk 89 of a fixture, designated generally by the numeral 92, which is adjustable relative to the needle bonding device 11. The fixture 92 may be any of those used in the prior art in order to adjust the height and the lateral position of a workpiece. Specifically, in the present invention, the fixture 92 includes a knurled disk 93 having an internally threaded aperture cooperating with an externally threaded portion of a shaft 94 for adjusting the height of the disk 89 relative to the support 46 and the needle bonding device 11. Another shaft 95 having an end threaded to a movable support 96 and having a knurled knob 97 at the other end is adjustable to lock the disk 89 at a particular height. Slidably connecting a block 101 to a stand 102 are a pair of slide plates 103 fixed to stand 102. The stand 102 is fixed to the support 46 by welding, bolting or a comparable fixing expedient. Additionally, a shaft 98, having a knurled knob 99 and an externally threaded portion positioned within a cooperating internally threaded aperture provided in the slidable block 101, serves to laterally locate the block 101.

In order to adjust the particular longitudinal position of the semiconductive body 14 relative to the needle of the bonding device 11, the tubular member 36 may be adjusted by loosening the clamps 38, 39 and 63 and the plate 62, and then locating the tubular member 36 in a desired longitudinal position. Next, the clamps 38, 39, 63 and the plate 62 may be tightened to securely hold the tubular member 36 in the desired location. Alternatively, a micromanipulator (such as that disclosed in the Bell Laboratories Record, published in 1956, volume 34, pages 90–92 or that disclosed in co-pending application, Serial No. 15,737 filed on March 17, 1960 by S. S. Charschan, now patent number 3,103,137) may be fixed to the stand 44 to provide a fine adjustment of the needle bonding device 11 longitudinally and laterally with respect to the semiconductive body 14.

*Operation*

In operation, the needle bonding device 11, FIGS. 1 and 2, is positioned in the chuck 27, FIGS. 4 and 5, the threaded sleeve 29 of which is then rotated to securely grip the device 11. Next, the lead 12, which is typically a gold wire having a diameter of one mil, is threaded through the guide 22 and positioned within the groove 21 of the cylindrical members 19. Such positioning may be accomplished with a lead shearing and orienting device such as that disclosed in co-pending application, Serial No. 135,032, filed on even date herewith by R. P. Claggett.

After the lead 12 is so positioned within the groove 21, the fixture 92, the clamps 38, 39 and 63 and the plate 62 are appropriately adjusted so that the lead 12 is positioned directly over but not in contact with the stripe 13.

After the lead 12 is so positioned over the stripe 13, the knob 76 is pulled rightwardly and rotated in a clockwise direction, as viewed in FIG. 6, to rotate the cam 72 against the sleeve 68. Such rotation of the cam 72 pushes the sleeve 68 against the washer 67 and spring 66. This pushing action of the sleeve 68 pivotally moves, about the pin 42, FIG. 4, the tubular member 36 upwardly and the needle bonding device 11 downwardly until the lead 12 contacts the stripe 13. Continued rotation of the knob 76 and cam 72 compresses the spring 66 so that such spring 66 pivotally pushes, about the pin 42, the lead 12 against the stripe 13 with a force dependent upon the amount of compression of the spring 66. Then, the pin 77 is placed in a radial slot 78 and held therein by the spring 81. Typically, the pin 77 is placed in such a radial slot 78 that the needle bonding device 11 pushes the lead 12 against the stripe 13 with a force of about ten grams for a one mil gold wire. This force provides a bonding pressure of about 4000 pounds per square inch.

Figure 3:
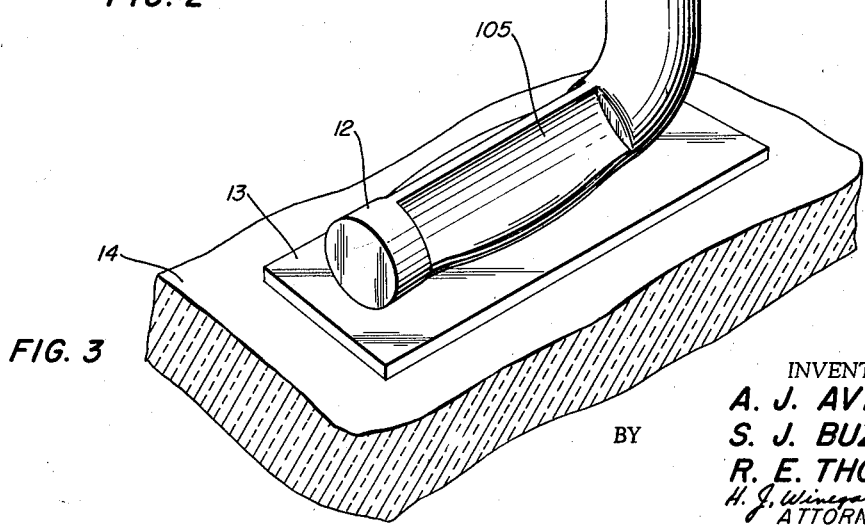
FIG. 3 shows a greatly enlarged perspective view of a bond made with the groove-type needle bonding devices of FIGS. 1 and 2.

Next, the switch 34 is closed to connect the alternating current source 35 to the transducer 33, whereupon electrical energy is converted into ultrasonic vibratory energy which tends to vibrate the arm 32 longitudinally. Such vibrations are transmitted through the chuck 27 to the needle bonding device 11 so that the cylindrical members 19 ultrasonically vibrate in the directions shown by arrows 106 in FIG. 2 to produce an ultrasonic scrubbing action between the lead 12 and the stripe 13. To prevent the lead 12 from losing contact with the stripe 13, the ultrasonic vibrations are of a very small amplitude since the stripe 13 is often only about two mils wide. Moreover, the ultrasonic vibrations, with the consequential scrubbing action at the lead-stripe interface, is continued for a period of about a tenth to one-half second. This period is advantageously controlled by a conventional timing device connected in the circuit of conductors 24. During this period, the ultrasonic scrubbing action is concentrated at the lead-stripe interface where the bond is desired by the gripping action of the groove 21. Such vibrations do not occur at the lead bonding tip interface due to the structure of the groove 21. Consequently, any oxides which may have formed at the lead-stripe interface are broken up and removed by the ultrasonic scrubbing action and the metal of the lead 12 fuses to the stripe 13 to form a bond 105, clearly shown enlarged in FIG. 3. From an examination of the bond 105 of FIG. 3 it is noted that the bond 105 extends longitudinally along the stripe 13 to provide a substantial contact area between the lead 12 and the stripe 13. Hence, the bond 105 has a low electrical resistance and high mechanical strength.

Generally, at room temperature the ultrasonic vibrations are sufficient to bond the gold lead 12 to the aluminum stripe 13; however, for leads and stripes of other materials it may be desired to simultaneously heat either the lead 12, the stripe 13, or both during the production of the ultrasonic scrubbing action at the lead-stripe interface.

One of the major advantages of using ultrasonic bonding techniques to join a lead to a stripe formed on a semiconductive body is that the electrical characteristics of the semiconductive body are not substantially altered by the bonding. This is because a minimum of heat and pressure are used during the ultrasonic bonding operation. As is well known, a great deal of pressure applied to a semiconductive body may affect slippage in the crystal structure thereof. This, of course, may greatly impair the electrical properties of the semiconductive body. Additionally, as is well known, heat activates diffusion of doping materials used in the production of semiconductive bodies and therefore heat may impair the electrical properties thereof. Since the above-described ultrasonic bonding techniques do not necessarily entail the use of large quantities of heat, if any, or pressure, the electrical properties of the semiconductive body are not adversely affected from this standpoint. Although very satisfactory bonds have been formed by compression and thermo-compression bonding techniques, as disclosed in co-pending application, Serial No. 135,032, filed on even date herewith by R. P. Clagett, the above-described ultrasonic bonding techniques have the advantage of effecting bonds with a minimum of heat and pressure.

*Alternative Embodiment*

As an alternative embodiment of the invention, there is shown in FIGS. 7–10 a V-shaped groove-type needle bonding device, designated generally by the numeral 111, for bonding the lead 12 to the transistor stripe 13 formed on the semiconductive body 14. The bonding device 111 includes a support 115 having an elongated member 116 fixed thereto by welding, swaging, or the like. The elongated member 116 is composed of a nonmetallic material, which is hard and impenetrable as compared to the lead 12. Examples of such materials are glass, sapphire, quartz, diamond, or the like. By so using such a hard nonmetallic material for the elongated member 116, the lead 12 will not stick or back-weld to the elongated member 116 during ultrasonic bonding.

Formed on a flat portion 117, a chamfered edge portion 118 and a flat side portion 199 of elongated member 116 is a V-shaped groove 121 for passing the lead 12 through a guide 122 to the flat portion 117 of the groove 121. Preferably, the V-shaped groove 121 has a triangular cross-section with a base substantially equal to one and one-half times the diameter (typically one mil) of the lead 12 to be bonded and a height substantially equal to three quarters of the diameter of the lead 12. Moreover, the flat portion 117 of the groove 121 is preferably equal to substantially twice the diameter of the lead 12. The groove 121 having these preferred dimensions, firmly grips the lead 12 during bonding and concentrates the ultrasonic bonding energy at the lead-stripe interface where the bond is desired. By so gripping the lead 12 and concentrating the ultrasonic energy, excessive lead mash-out, back-welding and energy loss are virtually eliminated thereby obtaining optimum bond mash-out and strength.

In operation, the support 115 of the V-shaped groove-type needle bonding device 111 is mounted in the chuck 27, FIG. 4, and is used in conjunction with the apparatus 26 to effect a bond 107, FIG. 11. This bond 107 is effected with the device 111 in the same manner that the needle bonding device 11 is used to effect a bond 105, FIG. 3. However, due to the chamfered edge portion 118 of the V-shaped groove 121 there is a more smooth and gradual entry of the lead 12 to the bond 107 as shown at a curved portion 108. Due to this smooth and gradual entry of the lead 12 to the bond 107, such bond 107 has greater mechanical strength than the bond 105.

It is to be understood that the above-described apparatus may not only be used to bond gold wires to aluminum stripes formed on semiconductive bodies, but may also be used to bond any of a variety of wire-like members composed of other materials, such as copper or the like, to any of a variety of preselected parts, whether they be conductive, semiconductive, or even nonconductive.

It is to be further understood that the above-described embodiments of the invention are merely illustrative and that numerous modifications may be made within the spirit and scope of the invention.

What is claimed is:

1. A high frequency vibratory energy bonding device for bonding a gold wire to a preselected part, which comprises an elongated member having a flat surface at one end, a pair of parallel contiguous tungsten wires having equal diameters of substantially twice that of a gold wire to be bonded and fixed to said flat surface to form a groove for supporting the gold wire in bonding position, and means fixed to the elongated member for guiding said gold wire into said supporting groove.

2. An apparatus for ultrasonically bonding a gold wire to a contact area of a semiconductive body which comprises an elongated member having a flat surface at one end, means fixed to said elongated member opposite the end having said flat surface for producing ultrasonic bonding energy, a pair of parallel contiguous tungsten wires having equal diameters of substantially twice that of the gold wire to be bonded and fixed to said flat surface to form a groove having convex sides for supporting said gold wire, means fixed to said elongated member for guiding said gold wire into said groove, means for bringing said gold wire into contact with the contact area of the semiconductive body with a predetermined pressure, and means for energizing said ultrasonic energy producing means to establish ultrasonic scrubbing action between said gold wire and said contact area, whereby said gold wire is bonded to said area.

3. In an apparatus for bonding a fine wire to a preselected part wherein means are provided for producing high frequency vibrations, a device secured to said producing means comprising, an elongated member having a flat surface at one end, and a pair of parallel adjacent cylindrical members of a material harder than said wire fixed to said flat surface for forming a groove to support said wire and concentrate said vibrations at an interface between said wire and said part.

4. Apparatus for bonding a fine wire to a preselected part, which comprises an elongated member having a flat surface at one end, a pair of parallel adjacent cylindrical members of a material harder than said wire fixed to said flat surface to form a groove for engaging opposite sides of said wire, and means fixed to said elongated member for vibrating said elongated member and rendering said cylindrical members effective to vibrate said wire relative to said preselected part to bond the wire thereto.

5. In an apparatus for bonding a first wire having a given nominal diameter to a preselected area of a part, said apparatus including means for producing high frequency vibrations, and an elongated member vibrated by said producing means, the combination with said apparatus of a pair of parallel contiguous wires of a material harder than said first wire and having equal predetermined diameters of substantially twice that of the nominal diameter of said first wire, said pair of wires being secured to said elongated member to form a groove for engaging said first wire to cause vibration between said first wire and said area of said part to bond said first wire to said area.

6. In an apparatus for forming a bond of a predetermined length between a fine metal wire and a surface of a preselected part, said apparatus including a bonding tip having an end portion for engaging the wire and urging the same into pressing contact with the surface of the part and means for imparting high frequency vibratory energy to the bonding tip to cause vibration thereof in a direction having a substantial component parallel to said surface of the part at the point of contact, the improvement which comprises a pair of members of a material harder than the wire and having a length substantially equal to said predetermined length, each member of said pair of members having a convex peripheral surface portion extending said predetermined length perpendicular to said component of vibration and parallel to said surface of the part at the point of contact, said members being fixed to said end portion with said surface portions juxtaposed to form a groove having opposed convex sides and a length substantially equal to said predetermined length for receiving a preselected length of said wire and coupling said vibratory energy to said wire.

References Cited in the file of this patent

UNITED STATES PATENTS

| | | |
|---|---|---|
| 2,454,875 | Hyde | Nov. 30, 1948 |
| 2,985,954 | Jones | May 30, 1961 |
| 3,029,666 | Lovins | Apr. 17, 1962 |
| 3,056,317 | Huber | Oct. 2, 1962 |
| 3,083,595 | Frank | Apr. 2, 1963 |

FOREIGN PATENTS

| | | |
|---|---|---|
| 891,956 | Germany | Oct. 1, 1953 |
| 937,864 | Germany | Jan. 19, 1956 |

UNITED STATES PATENT OFFICE
CERTIFICATE OF CORRECTION

Patent No. 3,128,649 April 14, 1964

Arthur J. Avila et al.

It is hereby certified that error appears in the above numbered patent requiring correction and that the said Letters Patent should read as corrected below.

Column 1, line 19, for "of" read -- or --; line 64, strike out "to effect", second occurrence; column 2, line 15, for "new" read -- now --; line 18, for "of" read -- or --; line 51, for "transmiting" read -- transmitting --; line 70, for "strips" read -- stripes --; column 3, line 11, for "pan" read -- pin --; column 5, line 64, for "199" read -- 119 --.

Signed and sealed this 18th day of August 1964.

(SEAL)
Attest:

ERNEST W. SWIDER
Attesting Officer

EDWARD J. BRENNER
Commissioner of Patents